Nov. 9, 1926.
L. E. MILLS
1,606,171
METHOD OF MAKING SALOL AND OTHER ARYL ESTERS
Filed Jan. 19, 1925
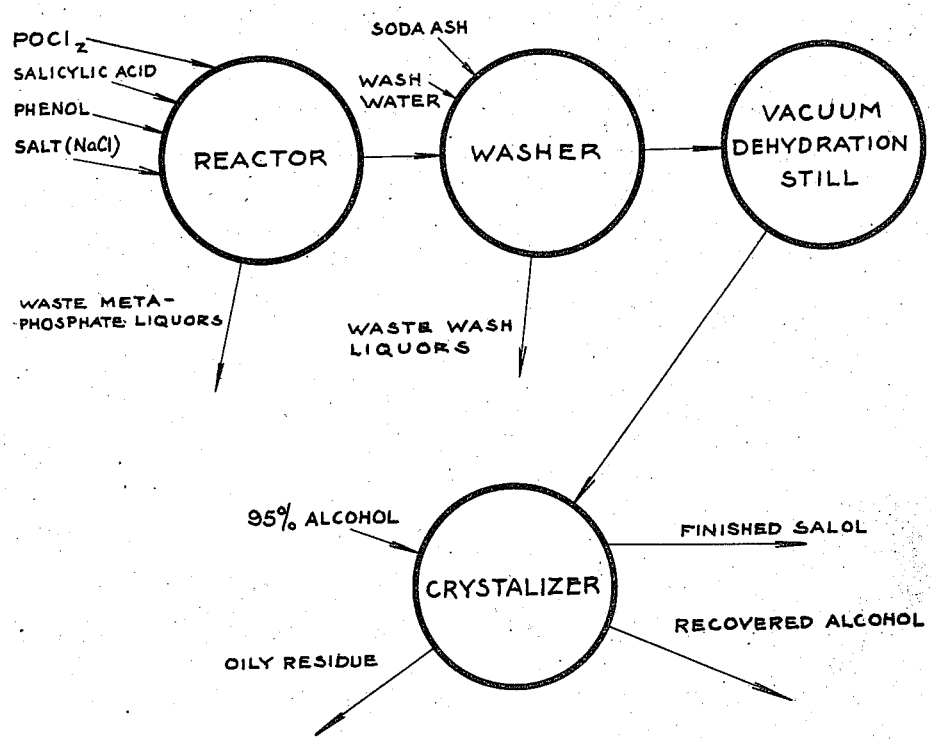
INVENTOR.
Lindley E. Mills.
BY
Fay, Oberlin & Fay
ATTORNEYS Patented Nov. 9, 1926.

1,606,171

UNITED STATES PATENT OFFICE.

LINDLEY E. MILLS, OF MIDLAND, MICHIGAN, ASSIGNOR TO THE DOW CHEMICAL COMPANY, OF MIDLAND, MICHIGAN, A CORPORATION OF MICHIGAN.

METHOD OF MAKING SALOL AND OTHER AYRL ESTERS.

Application filed January 19, 1925. Serial No. 3,343.

The therapeutic value of salol has been known for many years, it being the most important of a large class of drugs embodying the so-called "salol principle." The method of preparation followed for a number of years has been by the reaction of phosphorous oxychloride upon a mixture of salicylic acid and phenol as disclosed by German Patents Nos. 38,973 and 43,713 to Nencki and y. Hayden. The use of phosphorous oxychloride in the foregoing method for making salol and in the manufacture of other esters from organic acids and phenols leads to the formation of objectionable colored compounds that have to be removed from the desired product in order to render it satisfactory for use of the market. In other words, it is desirable to prevent the formation of aryl and carboxyaryl esters of the acids of phosphorous since this in turn retards the formation of the various highly colored dyes (salol red, for example) which are formed by heating these esters with a phenol. As an illustration of the foregoing difficulty it may be cited that salicyl-meta-phosphoric acid heated with phenol at 150° C. gives a greater amount of salol red than of salol.

The object of the present invention is to provide a modification of or improvement in reactions of the type in question whereby the formation of these undesirable colored compounds and other impurities may be to a large degree if not entirely prevented. To the accomplishment of the foregoing and related ends the invention then consists of the steps hereinafter fully described and particularly pointed out in the claims, the annexed drawing and the following description setting forth but one of the several ways in which the principle of the invention may be accomplished.

In said annexed drawing:

The single figure there appearing is a diagram or flow sheet representing the various steps involved in the manufacture of salol accordling to the present improved process or method.

Taking the manufacture of salol or phenyl-salicylate ($C_6H_4.OH.CO.O.C_6H_5$) for the purpose of illustration, such manufacture will consist of the following steps viz, (1) formation of the phenyl ester of salicylic acid (salol) by the action of phosphorous oxychloride on a mixture of salicylic acid and phenol in the presence of finely divided salt; (2) washing of the crude salol; (3) drying of the washed salol by vacuum distillation of the water; (4) crystallization of the dried salol from 95 per cent ethyl alcohol; (5) recovery by distillation of the alcohol.

As pointed out by Nencki two molecules each of salicylic acid and phenol react with one molecule of phosphorous oxychloride in accordance with the following equation:

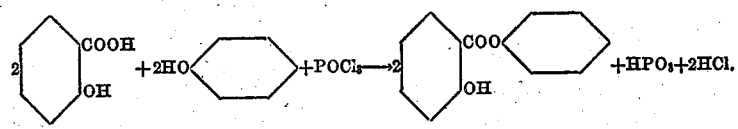

He also pointed out that the phosphorous appears in final form as meta phosphoric acid rather than ortho phosphoric acid according to the equation:

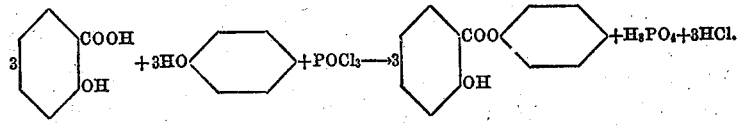

The salt referred to as being used in the first step of the present improved method is preferably sodium chloride but sodium metaphosphate likewise definitely improves the color of the product although it does not as greatly help the yield. In fact, any halide of an alkali or alkaline earth metal or for that matter, the salt of any such metal, and an acid that may be readily volatilized when liberated, will serve the same purpose, provided the presence of the salt or the liberated acid has no harmful effect on the materials of the reaction.

The advantage in using such salt arises from the fact that, due to the reaction at 100° C. between sodium chloride and meta phosphoric acid, whereby sodium metaphosphate and hydrogen chloride are formed, the meta-phosphoric acid is removed from the reaction mixture as fast as formed. In this way the formation of the undesirable esters of the acids of phosphorus and thus in turn the formation of the various highly colored dyes which are formed by heating these esters with a phenol, are substantially entirely avoided. The complete absence of these colored products where such salt is used at the indicated stage in the process of manufacture is attested by the absence of a red color in the crude salol or the alkaline wash waters, salol red in particular developing a color very similar to phenolphthalein in the presence of alkalies.

As another specific example of the beneficial effects of the presence of sodium chloride on the formation of aryl esters in general, I have prepared beta-naphthyl salicylate from salicylic acid and beta-naphthol with phosphorous oxychloride and sodium chloride in a manner identical with that just described for the preparation of salol, except that a temperature of 110° C., instead of 100° C., was employed. The reaction involved may be represented by the following equation, viz—

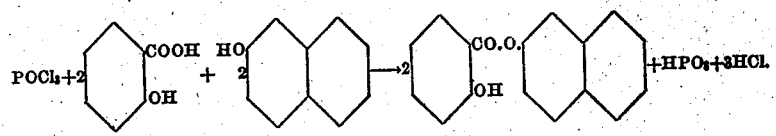

In carrying out the foregoing reaction, two runs were made using 34.5 g. salicylic acid (1 mol.), 39.5 g. B-naphthol (1.1 mol.), and 31.0 g. phosphorus oxychloride (.55 mol.).

The salicylic acid and B-naphthol were heated together to 110° C. (in run No. 2, 14 g. or 1 mol. of sodium chloride was added to the melt), and the phosphorus oxychloride run into the melt during fifteen minutes. Hydrochloric acid was evolved smoothly. Stirring was continued for one hour and the mixture allowed to cool somewhat. It was then washed at 95-100° C., successively, with water, sodium carbonate solution, and again with water. The crude material was allowed to solidify but was not crystallized.

In the case of the run without the addition of sodium chloride, the carbonate wash water was dark reddish brown in color and the washed product was a dirty greenish gray. The carbonate wash water from run No. 2, containing sodium chloride was a very light brownish yellow in color and the washed ester was a practically white solid. Both batches were carried through the reaction and washing in an identical manner so that the improved appearance of run No. 2 proved conclusively that the addition of sodium chloride gave a better appearing product.

Other modes of applying the principle of my invention may be employed instead of the one explained, change being made as regards the composition and method herein disclosed, provided the ingredients or steps stated by any of the following claims or the equivalent of such stated ingredients or steps be employed.

I therefore particularly point out and distinctly claim as my invention:—

1. In a method for making aryl esters by the action of phosphorous oxychloride on a mixture of a phenol and the desired acid, the step which consists in adding to the reaction mixture the salt of an alkali-forming metal and a readily volatilized acid.

2. In a method for making aryl esters by the action of phosphorous oxychloride on a mixture of a phenol and the desired acid, the step which consists in adding to the reaction mixture the halide salt of an alkali-forming metal.

3. In a method for making aryl esters by the action of phosphorous oxychloride on a mixture of a phenol and the desired acid, the step which consists in adding to the reaction mixture, in finely divided form, the halide salt of an alkali-forming metal.

4. In a method for making aryl esters by the action of phosphorous oxychloride on a mixture of a phenol and the desired acid, the step which consists in adding the chloride of an alkali-forming metal to the reaction mixture.

5. In a method for making aryl esters by the action of phosphorous oxychloride on a mixture of a phenol and the desired acid, the step which consists in adding sodium chloride to the reaction mixture.

6. In a method for making aryl esters by the action of phosphorous oxychloride on a mixture of a phenol and the desired acid, the step which consists in adding sodium chloride in finely divided form to the reaction mixture.

7. In a method for making salol, the steps which consist in reacting with phosphorous oxychloride upon salicylic acid and phenol in combining proportions, and adding to the reaction mixture the salt of an alkali-forming metal and a readily volatilized acid.

8. In a method for making salol, the steps which consist in reacting with phosphorous oxychloride upon salicylic acid and phenol in combining proportions, and adding to the reaction mixture the halide salt of an alkali-forming metal.

9. In a method for making salol, the steps which consist in reacting with phosphorous oxychloride upon salicylic acid and phenol in combining proportions, and adding to the reaction mixture, in finely divided form, the halide salt of an alkali-forming metal.

10. In a method for making salol, the steps which consist in reacting with phosphorous oxychloride upon salicylic acid and phenol in combining proportions, and adding to the reaction mixture sodium chloride in finely divided form.

Signed by me this 13th day of January, 1925.

LINDLEY E. MILLS.